Figure 2:
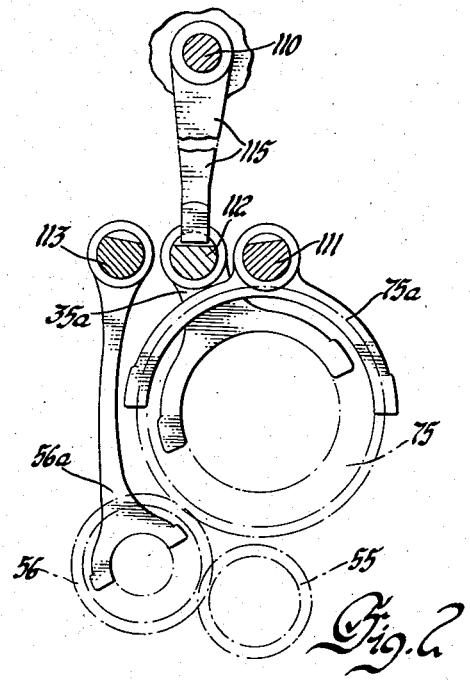

Feb. 16, 1954
H. O. SCHJOLIN
2,669,316
REMOTE-CONTROL SYSTEM FOR GEAR SHIFTING IN
ANGULARLY DISPOSED VEHICLE TRANSMISSIONS
Original Filed Nov. 5, 1945
3 Sheets-Sheet 1
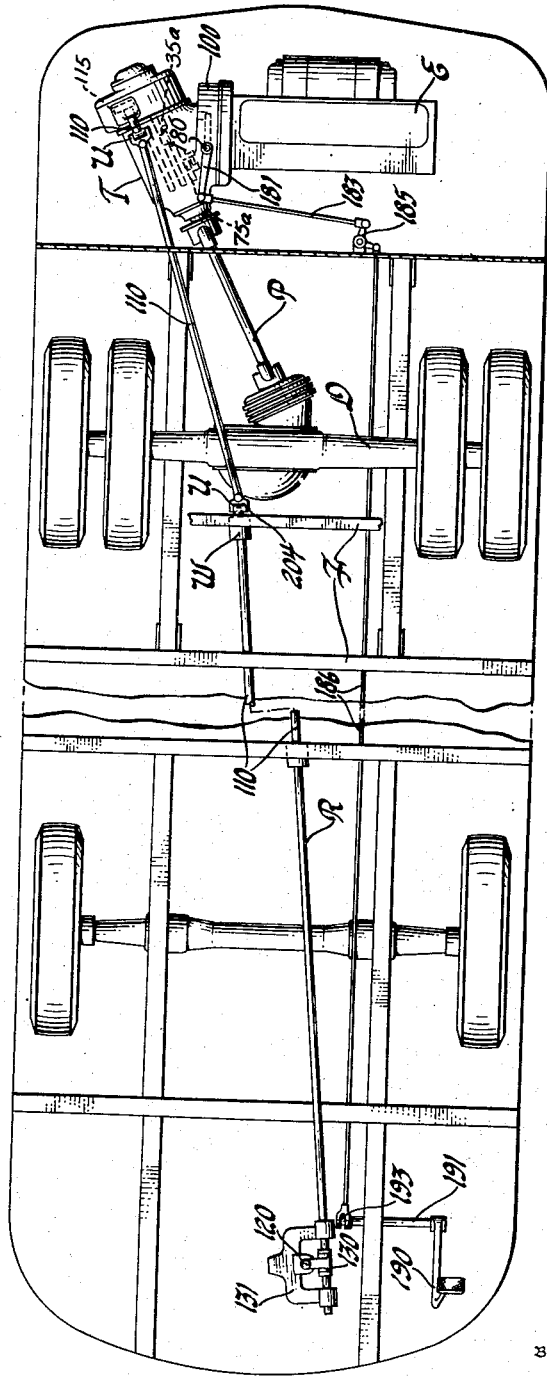
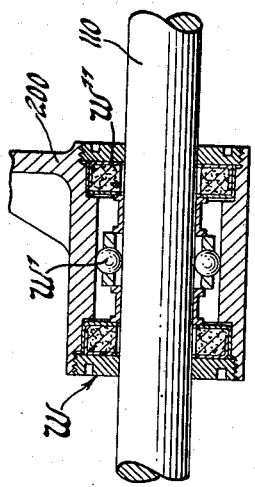
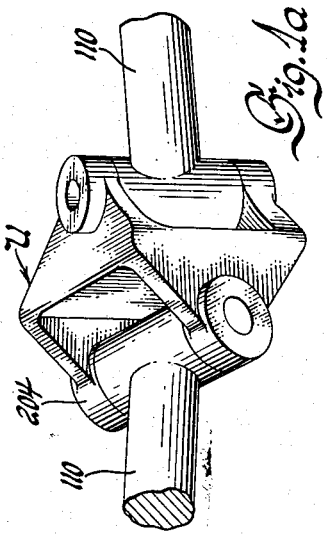
Inventor
HANS O. SCHJOLIN
By Blackmore, Spencer & Flint
Attorneys Feb. 16, 1954     H. O. SCHJOLIN     2,669,316
REMOTE-CONTROL SYSTEM FOR GEAR SHIFTING IN
ANGULARLY DISPOSED VEHICLE TRANSMISSIONS
Original Filed Nov. 5, 1945     3 Sheets-Sheet 2

Inventor
HANS O. SCHJOLIN
By Blackmore, Spencer & Flint
Attorneys

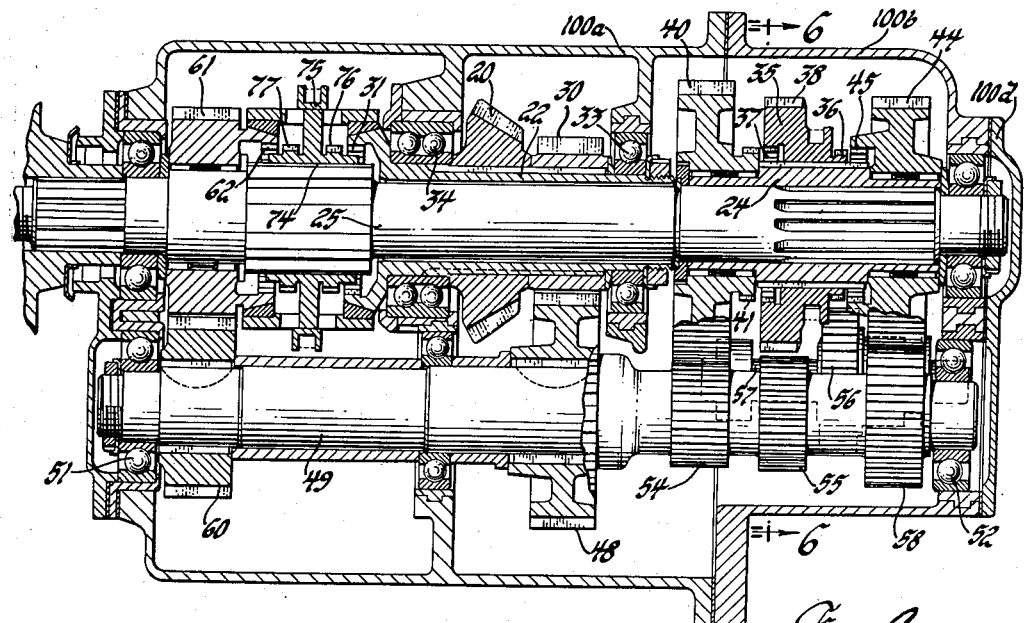

Patented Feb. 16, 1954

2,669,316

UNITED STATES PATENT OFFICE 2,669,316

REMOTE-CONTROL SYSTEM FOR GEAR SHIFTING IN ANGULARLY DISPOSED VEHICLE TRANSMISSIONS

Hans O. Schjolin, Birmingham, Mich., assignor to General Motors Corporation, Detroit, Mich., a corporation of Delaware Original application November 5, 1945, Serial No. 626,680. Divided and this application May 1, 1947, Serial No. 745,291

20 Claims. (Cl. 180—77)

The present specification is a divisional application to the applicant's Serial Number 626,680, filed November 5, 1945, for an invention entitled V Gear Transmission, now matured as of September 25, 1951, as Letters Patent U. S. 2,569,341.

The present invention pertains to a special arrangement of engine, gearing and axle drive of large vehicles for the primary purpose of providing superior accessibility for replacement of units, for better space distribution of drive members and units, and for obtaining an improved assembly thereof for lightness in weight and better geometry of the controls and drive line centers.

It is particularly adaptable for heavy vehicles having rear-mounted power plant drive systems.

One of the features provided herein is the angular arrangement of a gearbox with respect to the engine centerline, said gearbox being equipped with a special articulated and coordinated rocking and sliding shaft control assembly.

Another object of the invention is to couple the power of the engine to the transmission through a torque multiplying gear which converts the torque at a lower speed ratio to the angularly placed transmission input member, which in the example herewith is a hollow shaft supported in the diagonal transmission casing at both its ends, with the power delivery element located immediately adjacent to the point of reduction gear drive, both elements lying between the hollow shaft supporting bearings in the casing, which arrangement requires the special control assembly mentioned above.

Other objects include such a control arrangement for a power plant assembly mounted transversely at the rear of a vehicle with the torque converting mechanism thereof located angularly to the centerline of the engine and driving the forwardly located vehicle wheel differential device at a point centrally of the vehicle, or on the vehicle centerline.

A special object is the provision of remote control means for a rear-mounted power plant and transmission assembly in which the gear selection action is transmitted thereto by rotational motion of selector shafting rocked by parallel arm mechanism and in which the gear coupling and uncoupling action is transmitted thereto by sliding motion of the said selector shafting moved longitudinally by the translation of said mechanism, the master control element being universally pivoted.

Another object is the provision of universal joint means in said selector shafting connections solidly coupling the elements of said shafting such that for given operator translation of said mechanism, the said coupling and uncoupling of the gears follows directly the said translation action thru sliding of said joint means and said shafting elements, with a minimum of lost motion.

An additional object is the providing of a remote ratio shift control for a four-speed-and-reverse gear unit having selector and actuator mechanism coupled to articulated shafting, which applies a tensional force to said shafting for shifts to reverse low and third gear ratio, a compressional force for shifts to second and fourth speeds, and a parallel arm rocking force which is applied in turn to rock a selection and actuation member for the gears.

Other objects and advantages will appear in the specification below as the subject matter is discussed in detail. In the figures:

Fig. 1 is a plan view of an installation of the invention in a motor vehicle, including the control connections. Fig. 1a is a view of the universal coupling of the transmission control mechanism and Fig. 1b is a sectional view of the supporting means for the clutch control in the vehicle frame, by mounting unit W.

Figure 3A:
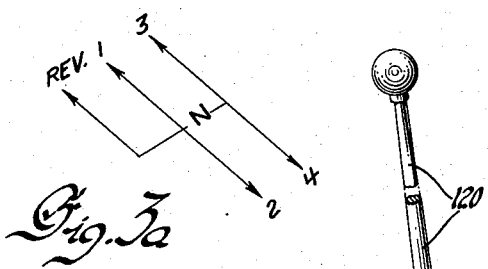
Figure 2A:
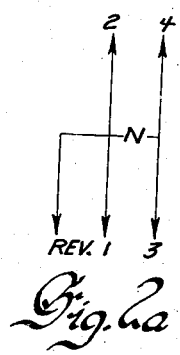
Figure 3:
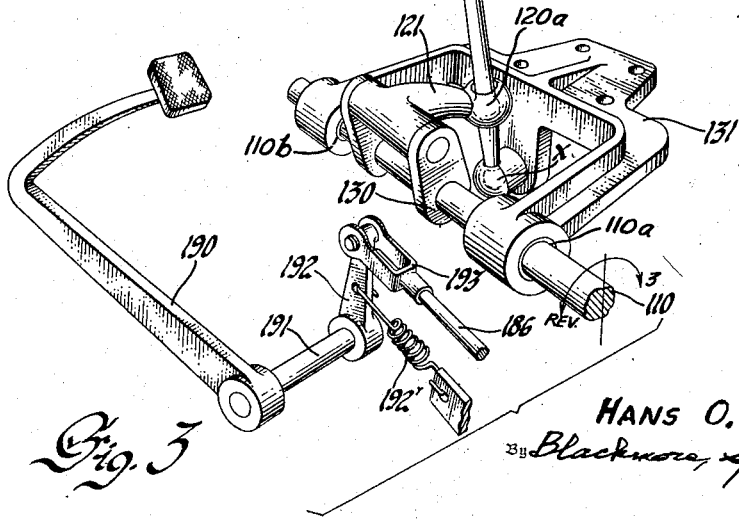

Fig. 2 is a schematic view of the internal transmission control mechanism operated by the connections of Fig. 1, the Fig. 2a showing the positional motion pattern for the ratios. Fig. 3 is a view of the control mechanism located in the driver's station at the front of the vehicle as in Fig. 1, and Fig. 3a is a diagram of the ratio shift motions of the gear selector lever, corresponding to the ratio diagram of Fig. 2a showing the shifter head pattern inside the gearbox.

Fig. 4 is a section taken transversely through the gearing box T of Fig. 1 to show the space distribution of the gear and shifter elements.

Figure 1 shows a plan view layout of a vehicle in which the invention is installed. The section at the right shows the engine assembly E, the transmission assembly T, the propeller shaft P and the drive differential D driving the vehicle rear wheels. As will be understood further the vehicle main clutch is controlled by a fork operated through external lever mechanism from the driver's station at the front of the vehicle.

Shaft 180 supported in the casing section 100 is attached to the clutch fork inside the casing 100, and projects externally to the top of the gear box where lever 181 is attached to it. Bellcrank 185 is supported on the transverse bulkhead and is linked to the lever by rod 183, and to long rod 186 which extends to the forward portion of the vehicle. Rod 110 is supported in flexible bushings as shown in Fig. 1b in the various bulkheads cross members so that it has straightforward rectilinear motion, shaft R being a continuation of shaft 110.

Clutch pedal 190 shown in Fig. 3 in detail, is attached to cross shaft 191 supported on the frame for rotation, and the latter is attached to lever 192 clevised at 193 to rod 186, and the pedal is normally retracted by a spring 192' which is deflected upon operator foot pressure.

The control mechanism of Figs. 1 to 3 is applied to the drive structures of Fig. 4, that of Fig. 2 pertaining to the mechanism mounted in or on the gearbox, and that of Fig. 3 to the operator's control means located remotely at the front of the vehicle.

Fig. 2 requires to be studied in connection with Fig. 4.

As shown in Fig. 4 the input member of the angularly-placed transmission unit of Fig. 4 is hollow shaft 22 fitted with gear 30 and bevel gear 20 meshed with and driven by a bevel gear in clutch casing 100, hollow shaft 22 being supported in casing section 100a by bearings 33 and 34.

Countershaft 49 mounted in bearings 51, 52 and as shown, is driven by input gear 30 meshing with gear 48 affixed to shaft 49, and transmits reduction gear torque to the various elements rotating with transmission shaft 25.

Low gear torque is transmitted thru meshed gears 54—40 to double-jaw slider 35, splined to sleeve 24. It will be noted that the planar section representing the toothed area of torque transfer is adjacent bearing 33 and close to the engine centerline for maximum support of the loads at the strongest beam load supporting section.

Second gear torque is transmitted through gear pair 58, 44 and teeth 45, 36 of the jaw clutch of slider 35, and the low-2nd-low ratio transitions are made by shift reciprocation of slider 35 on spline sleeve 24 of shaft 25.

Reverse torque is obtained by independent motion of reverse idler 56 into common mesh with the external teeth 38 of slider 35 and countershaft gear 55.

The gear member of largest size and heaviest torque requirement is located close to the engine centerline wherever possible.

The third speed torque is transmitted thru gear pair 60, 61 to slider 75 splined on shaft 25 at 74, and thru the jaw clutch teeth 62, 77. Direct drive between shafts 22 and 25 is obtained by meshing the jaw teeth 31, 76 of shaft 22 and slider 75.

The shifter pattern for Fig. 4 for obtaining these drive ratios in terms of left, neutral and right shift, is:

|  | Slider 35 | | | Slider 75 | | | Idler Gear 56 |
| --- | --- | --- | --- | --- | --- | --- | --- |
|  | L. | N. | R. | L. | N. | R. |  |
| Reverse |  | x |  |  | x |  | L |
| Neutral |  | x |  |  | x |  |  |
| Low | x |  |  |  | x |  |  |
| Second |  |  | x |  | x |  |  |
| Third |  | x |  | x |  |  |  |
| Direct |  | x |  |  |  | x |  |

This is a special form of 4-speed and reverse gear in which the input member is a relatively long hollow shaft supported separately in centrally located casing bearings, and equipped with a single transmission input gear and a single direct drive jaw. The straddle form of gear unit having a central point of input reduction speed transfer and laterally placed low torque, and high torque groups provides a maximum of strength with lightness of the supporting structure.

Fig. 4 shows the arrangement of the casing portions 100a, 100b and 100d which form the assembly for support of the drive mechanism on the engine.

The rightward end of the angularly-placed gear assembly of Fig. 4 is readily removed by taking off end plate 100d, releasing the screw-and-nut fittings on the ends of shaft 25 by performing a similar loosening of the countershaft 49, and detaching of 100b from 100a. This enables ready repair and adjustment of the gear elements which receive the most wear, and without disturbing the high speed gearing in the compartment 100a, or the input driving gear group.

Figure 2 is a sectional view of the shifter forks of transmission casing 100b to show the arrangement of the gear and shifter mechanism. The casing 100b is attached to the flywheel-enclosing, and main clutch housing section of the engine 100a, and is machined to accommodate longitudinal motion of the slider forks and rods. The fork 75a is affixed to rail 111, and is moved longitudinally to mesh and demesh the jaw clutch portions of the 3rd-4th slider 75 shown in Fig. 4. The master shifter rod shaft 110 is mounted parallel to the rails for both axial and rotational motion so that its affixed finger lever 115 may swing about the axis of shaft 110 and intersect the radial cut notches in the shift rails.

The shifter 35 of Fig. 4 is similarly moved by fork 35a attached to shift rail 112 mounted in the casing for parallel movement with shaft 110 and the other rails.

The reverse idler gear 56 of Fig. 4 is shifted by fork 56a attached to shift rail 113.

With the gear mechanism in neutral the notches of the rails are in alignment so that the lever 115 of the master shifter shaft 110 may swing freely to intersect any one of the three. To facilitate understanding of this shifter motion the number and letter pattern of Fig. 2a is shown and Fig. 3a upward and to the left of Fig. 3 is in alignment with the shift lever 120. The longitudinal centerlines of the shifter shafts and rails, corresponding, are shown in Fig. 2a. The numeral 200 indicates in Fig. 1b an extension of one of the frame members F for the supporting unit W which has the central ball member W' and the seal elements W'' enclosed by appropriate end plate.

When the shifter shaft 110 is rotated clockwise to its limit of motion in Fig. 2 the arm 115 intersects the notch of rail 113 so that when the shifter shaft is moved upward and to the left in Fig. 3 the reverse idler fork 56a slides the gear 56 on idler shaft 57 into mesh with countershaft gear 55 and the teeth 38 of slider 35. This establishes reverse gear drive. Reverse is demeshed by corresponding opposite motions.

To understand clearly how the gear selector mechanism of Figs. 1, 2 and 3 operates to shift the sliders of Fig. 4, it should be observed that the shift rails 111, 112, 113 of Fig. 2 follow a shift pattern as indicated in the diagram of Fig. 2a, the shifter finger 115 sliding with shaft 110 and moving the rails in a direction at right angles to the cross-shift line at N, to engage a ratio, and rocking to select one of the three rails as the shaft 110 is rotated by the external mechanism of Fig. 1.

In viewing Fig. 1 it will be seen that if shaft 110 is rotated clockwise, as viewed from the bottom of the figure, shaft 110 and finger 115 of Fig. 2 will be similarly rotated in the plane view and will intersect notch of rail 113, which moves the reverse idler fork 56a. Now to shift the idler gear 56 from neutral toward the engine shaft center so as to pick up gears 55 and 38, the shaft 110 must be pulled toward the eye of the observer in Figs. 2 and 2a. This requires the structure of Fig. 3 to apply a pull on shaft 110 upward and to the left, following the rocking motion, which as viewed in Fig. 3 is shown by the arrow at REV to be a counterclockwise motion.

The inclining of the shift lever and motion upward and to the left, as shown in Figs. 3 and 3a will therefore mesh the reverse gear.

Similarly, rocking the gear lever 120 to the right, rotates shaft 110 clockwise as viewed in Fig. 3, counterclockwise in Fig. 2, and causes finger 115 to enter the notch of rail 111 to move fork 75a of slider 75 of Fig. 5 when the head of the lever is moved to "3" or "4," for third or fourth gear. A pull on shaft 110 will cause slider 75 to mesh teeth 77—62 to couple the 3rd gear pair 60, 61 to transmission shaft 25 and to the input torque path thru gears 20, 30, 48.

The above motions are of course paralleled for the selection of 2nd and 4th gear, as should be clear from the notations on the drawings, as described below.

When low gear is desired, the shifter shaft 110 is rocked to intermediate position so that the lever 115 intersects the notch of shaft 112, and following motion being a pulling action similar to that for reverse, to move the fork 35a and slider 35 to mesh the jaw clutch teeth 37, 41 and couple the countershaft gear 54, and gear 40, to the output shaft 25. Reverse of these motions demeshes low gear drive.

The arm 115 of master shaft 110 when in intermediate rocking position may be shifted axially to move rail 112 in the opposite direction which moves the slider 35 to engage the jaw teeth 36, 45, and connects the countershaft gear 58 and the gear 44 to drive the output shaft 25 in second speed gear ratio.

The shift rail 111 attached to the fork 75a is moved to mesh jaw teeth 77, 62 in order to transmit third speed gear ratio from countershaft gear 60 and 61 to the output shaft 25. Direct drive is obtained by registering the arm 115 of shaft 110 with the notch of rail 111 and sliding the rail oppositely to the above 3rd speed motion.

External to the gear box in Fig. 1 is universal coupling U made as shown in Fig. 1a, and pivoted to shaft 110 extended and articulated at 204, its extension being supported in the frame cross member just forward of the driving axial center. The articulated shaft 110 terminates in the driver's station at the front of the vehicle in a crank arm fitting 130, and supported for longitudinal and rocking motion in a yoke member 131 supporting bearings 110a and 110b. The operator's gear shift control consists of a lever 120 swiveling in a link element 121 of fitting 130 and supported for rocking motion at a fulcrum point X formed in the base of the yoke member. The latter and number diagram shown in connection with Fig. 3 indicates the movements of the shift lever with respect to the hand of the driver, for the different gear ratios. It will be observed that forward movement of the head of the gear lever 120 will slide the fitting 130 forward, and thereby slide the fitting 130 in the same direction, to place the shaft 110 and attached couplings under tension which by reference to Figs. 1 and 2 will translate the master shaft 110 and arm 115 to mesh the gear elements for reverse low or third speed ratio, while putting this shaft structure under compression by rocking of lever 120 rearwardly will cause the second or fourth (direct) gear elements to be coupled. The swivel joint 120a connects shift lever 120 with the link 121 of crank arm 130.

The main clutch in casing 100 is engaged and disengaged by pedal 190 of Fig. 3, for all ratio changes in the customary manner.

The arrangement of driving elements may be described as a V form of transmission, which however, is only descriptive of the power unit arrangement.

The engine shaft is connected to the flywheel, and the flywheel is connected to the transmission input bevel gear 20 as described and shown in Fig. 4 of the parent patent to the present application.

The casing assembly 100 is divided at a point convenient for assembly and repair of the clutch, and the clutch compartment is formed by two sections, one of which extends farther to the point where it is joined to the transmission case section 100b, also as described and shown in Fig. 4 of the aforementioned parent patent.

The transmission casing is built up of sections as shown in Fig. 1, section 100b housing the low, second and reverse speed gear groups; and section 100a containing the primary drive from the engine, and the synchronized third and fourth speed gear groups.

The transmission shaft 25 extends through both casing sections 100a and 100b and is mounted in a bearing at one end and another bearing at the remote end where the output flange is splined. In the central part of the transmission, rotatable sleeve 22 surrounds the transmission shaft 25 and carries the bevel gear 20 meshing with the bevel gear in clutch casing 100, carries the reduction drive input gear 30 and is formed into jaw clutch 31 which, as will be seen, is for the purpose of obtaining direct drive. The sleeve 22 is mounted in the web of the casing section 100a by bearing 33, and by double row bearing 34 on the opposite side, to provide a rigid, accurate mounting so that the bevel gear in clutch casing and bevel gear 20 will run true. The gear pair comprising the bevel gear in clutch casing 100 and bevel gear 20 with sleeve 22 and input gear 30 may be changed to a lower or higher ratio to accommodate various engines having differing torques for given shaft speeds, providing adaptability to field replacement.

For low and second speed drive, splined sleeve 24 of the transmission shaft 25 carries the double jaw slider 35 with external teeth 36, and internal teeth 37, and having gear teeth 38 cut on its periphery. The 2nd reduction output gear 44 is mounted by needle bearings on sleeve 24 and has internal teeth 45 which may mesh with the teeth 36 of the aforesaid jaw clutch. On the opposite side of the jaw clutch slider, gear 40 is mounted likewise on needle bearings and has jaw teeth 41 which may mesh with the internal jaw teeth 37 on the low and second gear slider for low gear drive.

The countershaft 49 is supported in bearings 51 and 52 in the case sections as shown and has three gears formed integrally or attached, the first gear 58, meshing with 2nd gear 44, the second gear 55 meshing with slidable reverse idler gear 56 mounted on the reverse idler stub shaft 57, and the third gear 54 meshing with the lowest speed gear 40. Gear 48 is the input gear, and gear 60 is the 3rd speed input gear.

The central part of the countershaft 49 is keyed to the countershaft input gear 48 constantly meshing with the main shaft reduction input gear 30 of sleeve 22. At the far end of the transmission is located the third speed pair of meshing gears, gear 60 being keyed to the countershaft 49 and its companion gear 61 mounted on needle bearings on the transmission shaft 25 and having overhanging jaw clutch 62.

Transmission shaft 25 is splined to accommodate slider 75 having two rings of external teeth 76 and 77 for meshing respectively with the teeth 31 of sleeve 22 for direct drive, and with the teeth 62 of the third speed output gear, for setting up third speed ratio.

In the drawings, the reverse idler gear 56 is shown conventionally. The idler gear 56 meshes not only with gear 55 of the countershaft 49, but also with the external ring of teeth 38 of slider 35 rotating with sleeve 24 splined to the transmission shaft 25.

The above described drive layout provides a novel form of angular drive transmission which enables the designer of special purpose vehicles to fit the drive mechanism with the change speed gearing into a space of very restricted volume.

The applicant has filed an application for Letters Patent S. N. 507,204, dated October 21, 1943, now matured as Letters Patent U. S. 2,435,930, and dated February 10, 1948, disclosing an angle drive arrangement involving the use of a fluid torque converter displaced angularly in the manner shown in the present disclosure, and the mechanism herewith is directly interchangeable with the aforesaid application construction with a minimum of effort and displacement of parts.

The maintenance of tactile feel by the operator of gear position stations, in remote controls, is always a difficult problem, due to the fact that vehicle frames weave and distort under load and the flexibly mounted power plants provide additional motion components which tend to be transmitted into vibrations of the controls while destroying the operator's feel of the mechanism. In the present invention these troubles are overcome by first utilizing a single shift selector and actuator shaft, having limited angularity at its articulation points U, supported in the frame for both sliding and rotation as shown by the mechanism at W, Fig. 1b, and arranged to duplicate the movement of the operator's control head, as in Fig. 3, in the motion of the transmission control head diagrammed in Fig. 2.

The point of application of the control mechanism on the top of the casing 100a, with the master shaft 110 entering same at an angle, as shown in Fig. 1, is so taken that the net distortion of distancing upon the adjacent linkage at 204 for the rocking bearing W and the coupling joint U is insufficient to disturb the normal feel and setting of the lever 120, of Fig. 3.

The above advantages are believed clearly understandable of the invention of the drive arrangement and control, and the utility herein.

From the foregoing description of the construction and operation of the example of the invention herewith, it is clear that the advantages set forth in the preamble of the specification and in the main body of the text thereof are amply provided for. It will be seen that the present invention embodies novelties in the power drive arrangement, in the compartmenting of the drive elements for adequate support and accessibility, and in the control system which, while mechanical, affords the operator full manual feel of the operative movements of the control members of the power drive assembly, although the latter is placed remotely at the opposite end of the vehicle from the driver's station. Further and additional advantages are set forth in the appended claims, and it should be understood that various changes and substitutions may be made in the details of construction and arrangement of the members and parts without departing from the spirit of invention or from the scope of the appended claims.

I claim:

1. In a motor vehicle having a power plant drive assembly, a driver's station remote from said drive assembly, a transmission control support member located in said station and supported by said frame, bearings in said member and an elongated master shifter shaft supported in said bearings for longitudinal and rocking motion; a shift gear transmission unit associated directly with said assembly, a casing for said unit, gear ratio control means for said transmission operated by said shaft, said means including gear shifting mechanism movable rotatably and axially for engaging and releasing selected ratio drive elements of said transmission and connected to, and controlled by, said shaft, said mechanism being supported in said casing for such rotational and axial motion, a gear lever fulcrumed at one end upon said support member having a pivot for rocking motion in the longitudinal direction and in the direction of rocking of said shaft, and a crank fitting attached to said shaft and having a pivoted link swiveled to said lever at a point above said support member pivot, the arrangement providing a paralleling of the motion of said lever in both said directions in the motion of said shaft.

2. In the combination set forth in claim 1, the subcombination of sectional articulation joints in said elongated master shifter shaft in its connection to said gear ratio control means, and of supporting means for said joints located in portions of said frame lying between said station and the point of attachment of said control consisting of bearings which permit limited motion of said shaft.

3. In the combination set forth in claim 1, the subcombination of bearings supporting said shaft in said frame for both limited axial and rotational motion, of sections of said shaft, and of articulation means for said sections permitting limited changes of angularity while maintaining the axial and rotational motion positioning thereof between said fitting and said gear ratio control means.

4. A power transmission control head assembly and gear control arrangement consisting of a support member having separate arms, concentrically aligned bearings supported in said arms, a translatable and rockable transmission control shaft supported in said bearings, a fulcrum pivot on said member, a manually operable control lever having one end mounted upon said pivot for motion parallel to the translatable motion of said shaft and at right angles thereto, the opposite end of the lever being manually moved for said parallel and right angle motion, a crank arm fixed to said shaft and translatable and rockable therewith, a link pivoted at one end to said crank arm, and a swivel joint on said lever located at a radial distance from said pivot and joined to the other end of said link, the cooperation of said swivel, said link and said crank arm providing parallel motion in the same direction of the manually operated end of said lever with that of said shaft, and rocking motion of said shaft in the same direction of right angle motion of said lever.

5. A step ratio transmission control including a plurality of transmission shifter elements and a plurality of shifter rods arranged to move said elements to and from operative drive positions, a cooperating lever movable with said elements, a transmission ratio selector and shifter shaft effective to select one of said shifter rods by rotational motion and to cause axial motion of a selected rod by longitudinal motion of said shaft and said lever, an extension section of said shaft, bearings for said extension section supporting same for both axial and rotational motion, a mounting member for said bearings, an operator control assembly for said shaft consisting of a crank arm slidable and rockable with said shaft extension section, a link slidable with said crank arm and pivoted to rock said arm in a plane at right angles to the centerline of said shaft extension, a manually operable lever movable in a plane parallel to said shaft extension and having at one end a primary swivel pivot on said member and a secondary pivot connecting to said link, and an arrangement of said shifter elements with respect to said shaft, and said levers operable to provide initial selection of one of said elements by rocking motion of said first lever, said crank arm, said shaft and second lever and to provide translation of the selected element by motion of said second lever in said plane and by sliding motion of said shaft, said crank arm and said extension section.

6. In the combination set forth in claim 1, the subcombination of adjacent articulated sections of said shaft, of a universal joint mechanism joining said sections, each of said articulated sections being connected at one end to said universal joint and supported in an adjacent portion of said frame by bearings permitting limited deflection and rotational and axial motion of the shaft.

7. In a vehicle equipped with a rear mounted power drive assembly, having a transversely mounted engine and main clutch geared to a diagonally arranged change speed mechanism driving a forwardly placed axle differential; a laterally placed control head for said transmission, transverse frame members spaced along the major length of said vehicle and located at right angles to the center line of said vehicle and parallel to the shaft of said engine, a forwardly located driver's station, a transmission control support member located in said station and supported by one of said frame members, a gear shift control apparatus in said station, an articulated gear shift control shaft having adjacent sections extending diagonally from said apparatus across the center line of said vehicle to said control head, yielding bearings for said shaft mounted angularly in a plurality of said frame members so as to permit limited deflection motion of the articulated sections of said shaft, said apparatus including a gear lever fulcrumed at one end upon said support member having a pivot for rocking motion in the longitudinal direction and in the direction of rocking of said shaft, and a crank fitting attached to said shaft with a pivoted link swiveled to said lever at a point above said support member pivot, the arrangement providing a paralleling of the motion of said lever in both said directions in the motion of said shaft.

8. In a motor vehicle having an operator control station and a power plant assembly substantially separated by the effective length of the vehicle, a rear mounted axle differential located adjacent and forward of said power plant, a power transmission unit adjacent and driven by said power plant, ratio control means for said unit including an elongated master shifter shaft having effective rocking and sliding motion, a transmission control support member located in said station, a gear shift control apparatus in said station, said apparatus including a gear lever fulcrumed at one end upon said support member having a pivot for rocking motion in the longitudinal direction and in the direction of rocking of said shaft, and a crank fitting attached to said shaft with a pivoted link swiveled to said lever at a point above said support member pivot, the arrangement providing a paralleling of the motion of said lever in both said directions in the motion of said shaft, a shift control element in said unit operated by said shaft, said shaft having articulated sections which connect the gear shift control apparatus with said unit of said assembly in substantial sectional shaft alignment for the greater length of said vehicle and being only angularly displaced between a point adjacent said axle differential and the point of connection to said shift control element, and support bearing means for the sections of said shaft permitting limited deflectional motion of said shaft between the said control station and the said point of connection to said element.

9. In a power transmission control system for a power driven vehicle, a power plant and transmission assembly located at one end of the vehicle, shiftable gear drive elements of said assembly, a frame for said vehicle, transverse frame sections of said frame, a driver control station located at the opposite end of the vehicle from said assembly, transmission operated mechanism in said assembly including a member rockable and translatable for both selecting and shifting said elements, a rockable and translatable shaft, a transmission control support member located in said station and supported by one of said frame members, a control device in said station, said control device including a gear lever fulcrumed at one end upon said support member having a pivot for rocking motion in the longitudinal direction and in the direction of rocking of said shaft, and a crank fitting attached to said shaft with a pivoted link swiveled to said lever at a point above said support member pivot, the arrangement providing a paralleling of the motion of said lever in both said directions in the motion of said shaft, said shaft including jointed shafting sections connecting said member and said gear lever equipped with swivel joints which permit adjacent sections of said shafting to be angularly related, and bearings in said transverse frame sections supporting said articulated shafting section, said bearings including rolling elements which permit both rotation and axial motion of said shafting sections.

10. In motor vehicle drives, a power shaft and a load shaft, a change speed gear unit connecting said shafts divided into low speed and high speed ratio groups providing low reduction and reverse in the first and providing higher reduction and direct in the second group, between said shafts, a power input member of said unit located between said groups and adapted to be coupled to said load shaft for said direct drive of said load shaft in said second group, a plurality of shiftable members having parallel motions for coupling and uncoupling the ratios of said groups, a control shaft, a rockable shifter element moved by said shaft and adapted to rock initially and intersect the parallel axial paths of motion of said members and to shift a predetermined pair of members of same axially in either axial direction from said initial rocking position, a shaft portion for rocking and shifting said element and an arrangement of said pair of members effective by initial rocking and subsequent translation of said element to actuate selectively the low reduction drive by the first of said groups through axial motion applied to one of said members, to actuate selectively the higher reduction and direct drive of the other of said groups through axial motion applied to a second of said members, and to actuate selectively the reverse drive of said first group by rocking and translation of said element applied to a third of said members.

11. In the combination set forth in claim 10, the sub-combination of a master shifter shaft connected to rock and to translate said element axially, and of an articulated section of said shifter shaft connected to said control shaft for unit axial motion of said shaft with said element and for equal angular motion thereof with said element.

12. In motor vehicle drives, a power shaft, a load shaft, a transmission casing having two gear groups adapted for selectively coupling said shafts, the first group of which provides drive in low, second and reverse, the second group of which provides drive in third and direct speed ratio, a low and second gear clutch member in said first group, a third and direct clutch member in said second group, an input power member driven by said powershaft located between said groups and adapted to be coupled to said last named member, a reverse gear in said first group, three parallel ratio shifters mounted in said casing, a ratio shifter fork for the clutch member for low and second speed ratio of said first group operated by the central one of said shifters, a ratio shifter fork operating the clutch member for third and direct speed ratio of said second group operated by one of the said laterally placed shifters, a third shifter fork for the said reverse gear of said first group operated by the remaining laterally placed shifter, and a motion selecting an actuating mechanism for said first tooth named shifters operative to move one of same at a time for coupling the drive of one of said groups or the other alternatively, and to move the remaining shifter individually to couple the drive of said groups by an axial motion in the same direction as the motion of the other two shifters which provides low and third gear drive by the groups.

13. In a remote control mechanism for a change-speed gear of a vehicle power plant, a driver's station of said vehicle, a manually operable shifter device for said mechanism located in said station, a change-speed transmission located in said vehicle at a distance from said device, a slidable and rockable shaft connected to said device, the said device consisting of a shifter handle having two motions, the upper end of same being movable by the hand of the operator and the lower end pivoted to the frame of the vehicle, a link pivoted to said handle, a member supported to rock about the axis of said shaft and pivoted to said link such that swinging movement of the handle causes said link and said member to rock said shaft, and connected such that fore and aft movement of said handle causes the said shaft to slide in the same direction as the upper end of the handle is moved by the operator; a set of three parallel change-speed sliders in said mechanism, a shifter finger adapted to engage said sliders one at a time, an extension shaft of said first named shaft mounted to slide and rock within the said transmission, the motion thereof being transmitted to said finger, a ratio shift pattern of said sliders arranged such that two thereof provide two-way ratio shift from a neutral position, and a third one of said sliders provides one-way ratio shift from a neutral position, and an arrangement of the motion of said finger with respect to the intersection thereof with said sliders such that intersection of the finger with said two-way sliders occurs at a central and one lateral rocking position of said finger and with said third slider in the remaining lateral position.

14. In power drive apparatus, a change-speed transmission assembly of the longitudinal divided group type having terminal locations for two individual gear groups each located at either end of said assembly with a power input member centrally located between said groups and a power output member extending through one of said groups, shiftable change-speed gear-connecting elements of each of said groups adapted to be shifted in two directions from neutral to drive-establishing positions, a change-speed gear element of one of said groups shiftable only in one direction from neutral to its drive-establishing position, and shift control mechanism for said elements comprising a manually operable shifter shaft connected to a shift selector device, said shaft and said device being movable in predetermined axial and rocking directions and arranged to shift each of the elements individually and one at a time to and from said neutral and said drive-establishing positions.

15. In the combination set forth in claim 14, the sub-combination of an operating shaft, of an arm connected to said shaft operative upon said mechanism, of a set of slidable shifters of said mechanism for moving said elements arranged for initial intersection with the motion of said arm and for following individual motion transmitted by said arm, an operator-moved lever connected to apply to said shaft, and initial rocking selecting motion for causing said arm to intersect any one of said shifters, and operative to apply a translatory motion to the selected shifter without causing motion of any of the non-selected shifters, and an articulated angular shaft linkage between said lever and said operating shaft operative to translate the positioning motion of said lever to said operating shaft so as to provide equi-angular rotation and translation motion to that portion of the said lever moved by the operator to said operating shaft.

16. In the combination set forth in claim 14, the subcombination of an operating shaft, of a rockable arm connected to said shaft, of a set of slidable shifters for the elements of said mechanism, adapted to be intersected by said arm consisting of one shifter for each of said divided groups each shifter providing two-way drive-engaging motion of said first-named elements from a neutral position, and of a third shifter for the said third element for one of said groups providing one-way drive-engaging motion from a neutral position, an articulated rotatable and slidable linkage joined to operate said operating shaft, of an operator-moved lever connected to said linkage rockable to rock said shaft to two adjacent initial selection positions for said arm effective to preset a selected shifter for two-way drive-establishing positioning of either of said first-named two elements, operable to rock said shaft to a third initial selection position for said arm effective to pre-set said third shifter for one-way drive-establishing positioning of said third element, and of said lever being translatable to translate said shaft following the said initial rocking motions applied to said shaft and arm and thereby cause any of said selected shifters to move one of said elements individually to a drive-establishing position.

17. A shift head apparatus for a shifter gear transmission control shaft which shaft has rotational motion for initial selection of transmission sliding elements to be operatively translated into drive-establishing positions, and having sliding motion for the latter operation; said shifter apparatus comprising a manual lever moved laterally for initial drive selection and in the right angular direction thereto for said drive-establishing operation, a frame mounted fulcrum for said lever at the opposite end to the operator-moved upper end thereof, a crank arm mechanism fixed to said control shaft, a link element pivoted to said mechanism and swiveled to said lever so that the rocking motion of the free end of the lever causes said shaft to rotate in the same direction, and a frame mounting for said shaft supporting said crank arm mechanism for limited axial sliding motion of said control shaft and said mechanism, the said sliding motion being transmitted to the said mechanism through the coequal motion of said link element caused by said right angular motion of said lever from the said fulcrum.

18. A change speed transmission assembly of the longitudinal divided gear group type having two gear groups each individually located at either end thereof with a power input member centrally located between said groups, a power output member extending thru both said groups and connected to an output drive thru one of said groups, shiftable change-speed gear-connecting elements in both of said groups including an element of each group operative to be shifted in two directions from neutral to different drive-establishing positions, a third change-speed gear element of one of said groups shiftable only in one direction from neutral to a drive-establishing position, and shift control mechanism for said elements including a rockable and axially shiftable control member effective to shift each of the said two first-named and said third element individually and one at a time to and from said neutral and said drive-establishing positions.

19. A change speed transmission assembly of the longitudinal divided gear group type having two separate gear groups each individually located at either end of said assembly with a power input member centrally located between said groups, a power output member extending thru one of said groups and connected to a final drive, power connections from said power input member in both said groups to said power output member, including shiftable change-speed gear-connecting elements operative to be shifted linearly in two directions from neutral to different drive-establishing positions, and including a change-speed gear-element located in one of said groups shiftable only in one linear direction from neutral to a drive-establishing position, and shift control mechanism comprising a manually operable shifter shaft connected to a shift selector device, said shaft and said device being movable in axial and rocking directions and connected to operate said elements positively and to station same in said neutral and in said drive-establishing positions, said mechanism being effective to shift each of said elements individually and one at a time to and from said stated positions.

20. In control apparatus for power transmission drives, a transmission, a transmission casing, gear-changing elements within said casing, a gear-changing mechanism in said transmission casing, including a set of parallel shift rails arranged to engage and disengage the said elements by translatory motion, notches in each of said rails, a control shaft movable parallel to said rails and having a finger rockable with said shaft to intersect the said notches, said shaft projecting from said casing and operative to rock said finger for intersecting said notches and to move said finger longitudinally for shifting a selected rail, an externally located control construction for said shaft consisting of a crank rotatable and translatable with said shaft, a crank arm pivoted on said crank, and a manually operable drive selector lever movable in one plane to slide said crank and said shaft in the same direction of lever motion and movable transversely to said planar motion for rocking said crank and said shaft so as to rock the said finger, said lever having a fulcrum swivel joint at one end and a swivel joint connection with said crank arm.

HANS O. SCHJOLIN.

References Cited in the file of this patent

UNITED STATES PATENTS

| Number | Name | Date |
|---|---|---|
| 1,711,896 | McLean | May 7, 1929 |
| 1,788,894 | Schjolin | Jan. 13, 1931 |
| 1,814,426 | Becker | July 14, 1931 |
| 1,863,972 | Eckland et al. | June 21, 1932 |
| 1,993,912 | Austin | Mar. 12, 1935 |
| 2,106,841 | Griswold | Feb. 1, 1938 |
| 2,168,645 | Glidden | Aug. 8, 1939 |
| 2,195,509 | Buckendale | Apr. 2, 1940 |
| 2,219,601 | Quartullo | Oct. 29, 1940 |
| 2,238,616 | Wolf | Apr. 15, 1941 |
| 2,266,397 | Norelins | Dec. 16, 1941 |
| 2,435,930 | Schjolin | Feb. 10, 1948 |
| 2,457,400 | Roos | Dec. 28, 1948 |

FOREIGN PATENTS

| Number | Country | Date |
|---|---|---|
| 327,473 | Great Britain | Apr. 10, 1930 |
| 637,097 | France | Jan. 23, 1928 |